2,992,110
PROCESS OF IMPROVING THE PROPERTIES OF FERMENTED MALT BEVERAGES
Gerhard J. Haas, New York, N.Y.
(67—35 Yellowstone Blvd., Forest Hills 75, N.Y.)
No Drawing. Filed Mar. 25, 1959, Ser. No. 801,714
4 Claims. (Cl. 99—48)

The present invention relates to a process of improving the properties of malt beverages and more particularly to improving the properties of fermented malt beverages, such as beer, ale, and the like.

A number of difficulties in brewing are associated with the presence of oxalic acid in the wort and in the fermented beverages. This oxalic acid originates from the raw materials used by the brewer. Both malt und hops contain oxalic acid.

All difficulties due to oxalic acid originate from the precipitation during the brewing process as its extremely insoluble calcium salt. Like many other salts, calcium oxalate does not precipitate immediately at its formation, but it can form supersaturated solutions which may precipitate much later.

The deposition of calcium oxalate in the brewery gives rise to the formation of beer stone, a well-known, but unsightly and annoying deposit which is liable to clog lines and valves, and makes cleaning a difficult and costly job.

When calcium oxalate precipitates at a later stage, after the beer has been filtered and is out in the trade, it can give rise to hazes and may lead to wildness or gushing of the beer. In recent years there have been numerous publications concerning the connection between calcium oxalate and gushing. This phenomenon which constitutes a violent, almost explosive evolution of gas on opening a beer bottle or can, is one of the most feared occurrences in the brewing industry. So far the only remedy suggested for the removal of oxalate was the addition of an abundance of calcium salts. Such an addition will counter the phenomenon of super-saturation and bring about the precipitation of a greater amount of oxalate before the final filtration of the beer. However, the addition of large amounts of calcium salts may change the taste of the beer; it will also not prevent the precipitation of beer stone inside the brewery.

It is one object of the present invention to provide a simple and effective process of eliminating oxalic acid in the brewing process.

Another object of the present invention is to provide a valuable and highly effective preparation useful in the process of eliminating oxalic acid in brewing.

A further object of the present invention is to provide a substantially non-gushing fermented malt beverage of a surprisingly low oxalic acid content.

Other objects of the present invention and advantageous features thereof will become apparent as the description proceeds.

In principle the process according to the present invention consists in adding enzymes which are capable of decomposing oxalic acid to the wort or, respectively, to the fermented beverages during the brewing process and/or before bottling or canning of the beverages. Such enzymes are produced by fungi, Actinomycetes, bacteria, and higher plants, especially mosses (phylum Bryophyta). Such enzymes will destroy the oxalic acid present in the wort or, respectively, in the fermented beverage and will degrade it to innocuous substances.

Especially suitable have proved the enzymes prepared from wood rot fungi and more particularly from *Collovia veltipes* and from various mosses.

Both types of enzymes cause degradation of oxalic acid to carbon dioxide.

The *Collovia veltipes* enzymes and other mold enzymes act according to the formula $$HOOC.COOH \rightarrow HCOOH + CO_2$$

The formic acid produced will be trapped in the buffer substances of the beer and is non-toxic at the levels formed.

The moss enzymes act according to the formula $$HOOC.COOH + O_2 \rightarrow 2CO_2 + H_2O_2$$

The hydrogen peroxide produced is lost in the heat of the brewing process or is decomposed by the catalase of yeast to form $$2H_2O_2 = 2H_2O + O_2$$

Both moss and fungal enzymes cause very substantial reduction of the oxalate level in wort and fermented beverages. For determining the oxalic acid content of wort and beer the following oxalic acid assay methods were used. The classic gravimetric method utilizes the precipitation of oxalic acid in the form of insoluble calcium salt. The precipitated calcium oxalate is then ignited to form calcium oxide which is titrated with acid. A turbidimetric method using the insoluble calcium salt of oxalic acid has also proved of value. In addition an enzymatic method utilizing the enzymatic decarboxylation of oxalic acid by means of *Collovia veltipes* enzymes and measuring the amount of carbon dioxide evolved has been found to be of value.

The enzymes are added to the wort or fermented beverage either in the form of isolated and purified enzymes, or the moss may be added as such, preferably in dried form, to the wort or beverage. The enzymes may be added at any stage of the brewing process.

The following examples may serve to illustrate the present invention without, however, limiting the same thereto.

Example 1

An enzyme preparation is produced from the mold *Collovia veltipes* according to the procedure of Shimazono and Hayaishi, "J. Biol. Chem.," vol. 227, page 151 (1957). Two cc. of such an enzyme extract containing 460 units/cc. are added to 500 cc. of cooler wort. One cc. of a heavy yeast slurry is added and the wort is fermented at 23° C. for seven days. The resulting beer is then substantially end fermented. The yeast is filtered off and the beer is assayed for its oxalic acid content. It contains less than 2 parts per million of oxalic acid while the untreated control beer contains 27.2 parts per million.

Example 2

An enzyme preparation from *Collovia veltipes* of the same purity as the preparation used in Example 1 is added in a proportion of 0.8 cc. of extract to 500 cc. of wort and the mixture is allowed to stand at room temperature for 16 hours and is then fermented at 10° C. for 4 days. The beer is separated from the yeast and its oxalic acid content is determined. Control beer prepared under the same conditions contains 30.4 parts per million of oxalic acid, while the beer treated according to the present invention contains only 3.8 parts per million.

Example 3

A laboratory mash is prepared according to the method of the American Society of Brewing Chemists. To such a mash there is added 1 g. of *Hypnum imponens* Hedw. moss powder dried at 35° C. and then pulverized in a blender, at the time of mashing in. The oxalic acid content of the resulting mash is 7.6 parts per million while an untreated control batch contains 13.3 parts per million.

Example 4

To 1000 cc. of wort there are added at 70° C. (lautering off temperature) 2 g. of dried moss powder from the moss *Dieranum rugosum* (Hoffm.) Bridel. The wort is then left at 70° C. for 60 minutes. 1.4 g. of hop are added and the mixture is refluxed for 70 minutes and then filtered. Half the sample is analyzed as is, the rest is fermented to beer. Unfermented and fermented samples contain the following quantities of oxalic acid in parts per million:

|  | Control | With Moss |
|---|---|---|
| Wort unfermented | 41.8 | 23.2 |
| Wort fermented to beer | 41.0 | 22.2 |

Example 5

The procedure is the same as described in Example 4 whereby, however, in place of *Dieranum rugosum* moss the same amount of dried moss powder of *Hypnum imponens* Hedw. is added. The following oxalic acid contents are formed, expressed in parts per million:

|  | Control | With Moss |
|---|---|---|
| Wort unfermented | 41.8 | 24.7 |
| Wort fermented to beer | 41.0 | 24.6 |

Example 6

1 g. of the moss *Hypnum imponens* Hedw. is added to 500 cc. of cooler wort at 25° C. 2.5 cc. of a yeast slurry are added thereto and the mixture is shaken by hand for one to two minutes to aerate. The mixture is allowed to stand at room temperature for 16 hours and is then fermented for 10 days at 10° C. and analyzed for its oxalate content. The fermented control contains 34.2 parts per million of oxalic acid, while the treated sample contains only 5.9 parts per million.

Example 7

2 g. of the moss *Hypnum imponens* Hedw. are added to 1000 cc. of hopped wort at 80° C. (settling tank temperature). The mixture is kept at 80° C. (settling tank temperature) for 75 minutes. Thereafter, it is cooled to room temperature. Yeast is added and the mixture is fermented to beer at 10° C. for 10 days. The beer made from treated wort contains 18 parts per million of oxalic acid, the untreated control 31 parts per million.

It is, of course, understood that moss powder or isolated and purified moss enzymes or oxalic acid destroying fungal or bacterial enzymes can also be added to the fermented beverage during storage and before, during, or after filtration and that the beverage is mixed with such enzymes in amounts sufficient to cause the desired reduction in its oxalic acid content. The added moss powder is eliminated by filtration.

The amounts of enzymes or of moss powder to be added to the wort or fermented beverage may, of course, be varied. Analytical determination of the oxalic acid content in the treated material readily permits to determine the required amount of enzyme to be added.

Both temperature and oxygen tension are important factors for enzyme activity and this will vary according to the practices of the individual brewery.

The unit of oxalic acid destroying activity as given in Example 1 hereinabove is defined as the micromoles of oxalic acid destroyed at 37° C. per hour per mg. of protein present in the enzyme or the moss.

As mentioned hereinabove other mosses which contain enzymes capable of destroying, degrading, or decomposing oxalic acid or the enzymes produced therefrom may be employed in the process according to the present invention. Such other mosses are, for instance, the following mosses, although the invention is not limited thereto: *Hylocomium splendens* (Hedw.) B.S.G.; *Rhytidiadelphus squarrosus* (Hedw.) Warnst., *Rhytidiadelphus loreus* (Hedw.) Warnst., *Pogonatum alpinum* (Hedw.) Roehl., *Eurhynchium oreganum* (Sull.) Jaeg. and Sauerb., and others. The mosses and their enzymes are rather heat-stable.

Examples of bacteria which produce oxalic acid destroying enzymes are, for instance, various Pseudomonas species, such as *Pseudomonas astragali*, *Pseudomonas oxalaticus*, or other bacteria, such as *Vibrio oxaliticus*, *Bacterium oxalaticum*, *Mycobacterium lacticola* and others.

Certain Actinomycetes also produce oxalic acid destroying enzymes which can be used in the process according to the present invention.

It may be pointed out that, heretofore, it was not possible to reduce the oxalic acid content of fermented beverages to a content of less than about 4 parts per million. Beverages with such a low oxalic acid content, however, are in many respects superior to the heretofore produced beverages as this has been explained hereinabove.

I claim:

1. In the process of improving the properties of fermented malt beverages, the steps which comprise adding at least one stage of the brewing process dried and pulverized moss containing an oxalic acid-destroying agent to the brewing liquids in an amount sufficient to substantially reduce the oxalic acid content of such liquids, allowing the mixture to stand until reduction of the oxalic acid content is completed, and filtering the treated brewing liquids to remove the moss therefrom.

2. The process according to claim 1, wherein the brewing liquid to be treated is a substantially end-fermented malt beverage.

3. The process according to claim 1, wherein the brewing liquid to be treated is the wort.

4. The process according to claim 1, wherein the brewing liquid to be treated is the fermented malt beverage.

References Cited in the file of this patent

UNITED STATES PATENTS 2,878,125   Brenner _____ Mar. 17, 1959